Sept. 14, 1937.　　　　C. A. MARIEN　　　　2,093,332

PISTON RING

Filed Dec. 16, 1935

INVENTOR:
CHARLES A. MARIEN
BY Harry A. Benine
ATTORNEY

Patented Sept. 14, 1937

2,093,332

UNITED STATES PATENT OFFICE 2,093,332

PISTON RING

Charles A. Marien, St. Louis, Mo., assignor to Ramsey Accessories Manufacturing Corporation, St. Louis, Mo., a corporation of Missouri Application December 16, 1935, Serial No. 54,729

5 Claims. (Cl. 309—43)

My invention has relation to improvements in piston rings and it consists in the novel features of construction more fully set forth in the specification and pointed out in the claims.

The invention is more specifically directed to expanders or inner spring rings for association with the piston ring whereby the latter is maintained in proper working contact with the cylinder wall.

Figure 1:
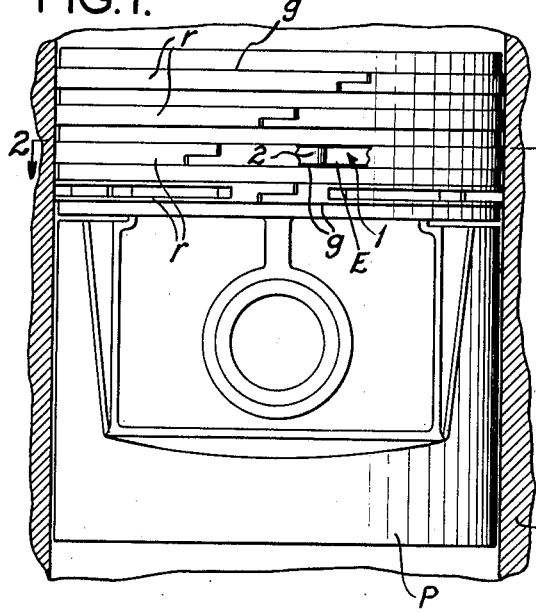
Figure 2:
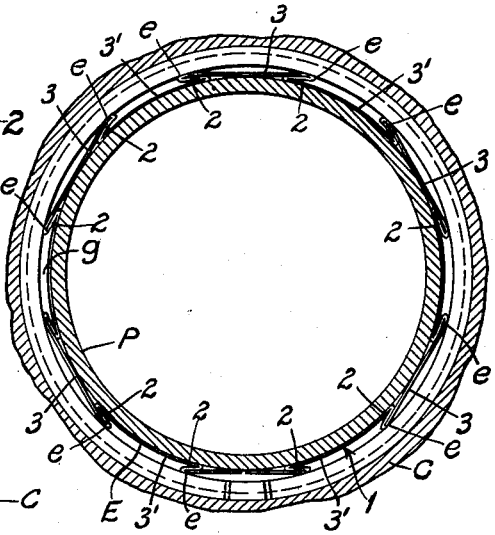
Figure 3:
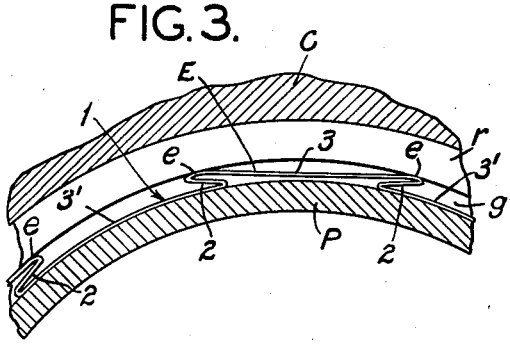
Figure 6:
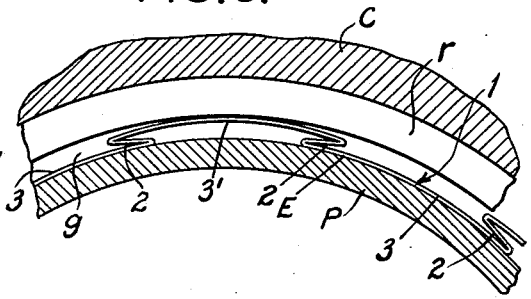
Figure 4:
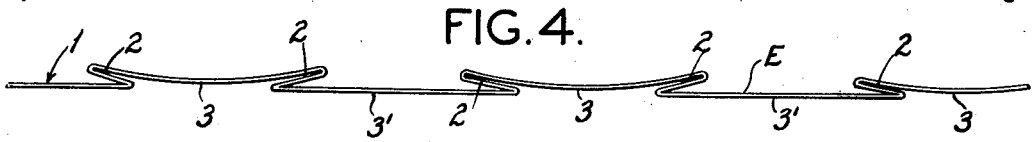
Figure 5:
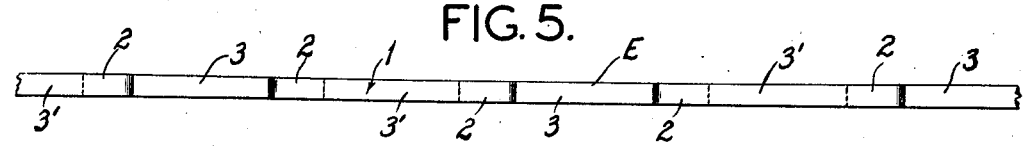

The objects of the invention are to provide an expander for piston rings that will cooperatively engage the ring with negligible friction; one that will impart its tension to the ring substantially uniformly throughout the ring circumference; one that is flexible and at the same time capable of rapid response to the irregularities of the cylinder; one that is durable and retains its tension over a long period of use; one that is insertable in the piston ring groove behind the ring in two ways, one of which gives twice as many bearing points against the ring as the other; one that may be formed in a strip of indeterminate length from which individual ring lengths may be cut off by the mechanic according to the size of the piston ring with which the inner ring is to be used; and one possessing other advantages that will be better apparent from a detailed description of the invention in connection with the accompanying drawing, in which:

Figure 1 is a side elevation of a piston, the rings of which include my improved ring expander or inner ring, and a portion of the cylinder wall being indicated in section; Fig. 2 is a horizontal cross-sectional view taken on the line 2—2 of Fig. 1; Fig. 3 is an enlargement of a portion of the cross-section shown in Fig. 2 so as to show the inner rings to better advantage; Fig. 4 is a side elevation of a strip of spring metal formed so as to embody the structural features of my improved inner ring, said strip being of indeterminate length or, if desired, of a length adapted for piston rings of specific sizes; Fig. 5 is a side elevation of the inner ring strip shown in Fig. 4; and Fig. 6 is a fragmentary sectional view similar to Fig. 3 with the inner ring inserted behind the piston ring in a reverse manner from that shown in Fig. 3.

Referring to the drawing, P represents a conventional type of piston operable in the cylinder C, said piston being provided with the usual piston ring grooves $g$ for the piston rings $r$. My improved inner ring or expander E is inserted in each of the grooves $g$ behind the ring $r$ so as to exert spring pressure outwardly on the ring at numerous points around the circumference thereof to augment the inherent tension within the ring $r$ and insure intimate working contact of the outer face of the ring with the wall of the cylinder C.

Inner rings or ring expanders are well known in the art and the present invention is concerned only with the specific construction of the inner ring E herein described. The inner ring is formed from a ribbon or strip 1 of spring steel which is bent throughout its entire length to form overlapping portions 2, 2, etc. in spaced relation. Any two adjacent overlapping portions 2 are in opposed relation and include between them leaf spring sections 3, or 3', the former being arcuate and the latter being substantially straight. The arcuate leaf spring sections 3 and the straight leaf spring sections 3' are arranged in alternation from one end of the strip 1 to the other. The curvature of the sections 3 is toward the sections 3' rather than away from said sections so that a line drawn parallel to the sections 3' and contacting with the outwardly projecting extremities of the overlapping portions 2 would lie entirely outside of the arcuate spring sections 3. In other words, the center of the sections 3 approaches the plane in which the second sections 3' lie. While it is preferable that the sections 3 and the sections 3' be of the same length, it is not indispensable and all of the sections 3 may be of one length and all of the sections 3' may be of a different length within reasonable limits without impairing the action of the inner ring. When an inner ring is formed by bending a strip of proper length in a direction opposite to that in which the individual sections 3 are bent, the sections 3' will envelop the piston P at the bottom of the groove $g$, and the sections 3 will straighten out so that on inserting the inner ring E into the groove $g$ behind the ring $r$ it will contact with the ring $r$ at points $e$, $e$ adjacent to the extremities of the overlapping portions 2, 2. Thus the inner ring will have as many contacting points with the ring $r$ as there are overlapping portions 2, or twice as many contacting points as there are spring sections 3 or 3'. This is shown clearly in Figure 3.

If, however, the strip 1, which is to form the inner ring, is bent in the opposite direction, or to curve in the same direction as the sections 3, then the sections 3 will envelop the piston P and the sections 3' will become arcuate, having a curvature similar to that of sections 3, although on a shorter radius, and will contact intermediate their extremities with the ring $r$. Thus, instead of having twelve contact points, as in the application shown in Figures 2 and 3, there will be but six contact points, or one contact point for each spring section 3'.

It is obvious that when the inner ring is bent so as to provide twelve contact points with the ring r, as shown in Figure 3, it will exert greater pressure at a greater number of points on the ring r than when it is bent so as to provide six contact points. The reason the pressure will be greater when there are twelve contact points is that these points are close to the overlapping portions 2, 2 where the spring effect is stiffer than it is intermediate these overlapping portions 2, 2.

Having described my invention, I claim:

1. A spring expander adapted for use in the groove of a piston ring between the bottom thereof and the piston ring, said expander comprising a ribbon of steel in the shape of a ring having a plurality of endwise connected spring sections formed in overlapping relation, some of said sections being substantially planar and some concavo-convex.

2. An expander for piston rings consisting of a continuous flat strip of spring metal having return bent portions therein throughout its length.

3. An expander for piston rings consisting of a continuous flat strip of spring metal having return bent portions therein throughout its length, said bent portions being in opposing relation.

4. The combination of a piston ring, and a piston ring expander, said expander being disposed behind said piston ring and consisting of a strip of ribbon-like spring metal crimped lengthwise in opposite directions at longitudinally spaced points to form circumferentially overlapping spring elements, all of said spring elements having one side edge thereof in a common horizontal plane disposed at substantially a right angle to the axis of said piston ring.

5. A piston ring expander consisting of a strip of flat ribbon-like resilient metal crimped lengthwise to form a plurality of long, and relatively short spring elements, respectively, disposed in alternating relation to each other, at least two of said long spring elements being arranged to partially overlap each other and at least one of said relatively short spring elements being disposed intermediate said overlapped portions and at an angle thereto and connecting said two long spring elements to each other.

CHARLES A. MARIEN.